Dec. 18, 1934.   L. M. REED   1,985,059
STEAM TRAP
Filed Nov. 20, 1931
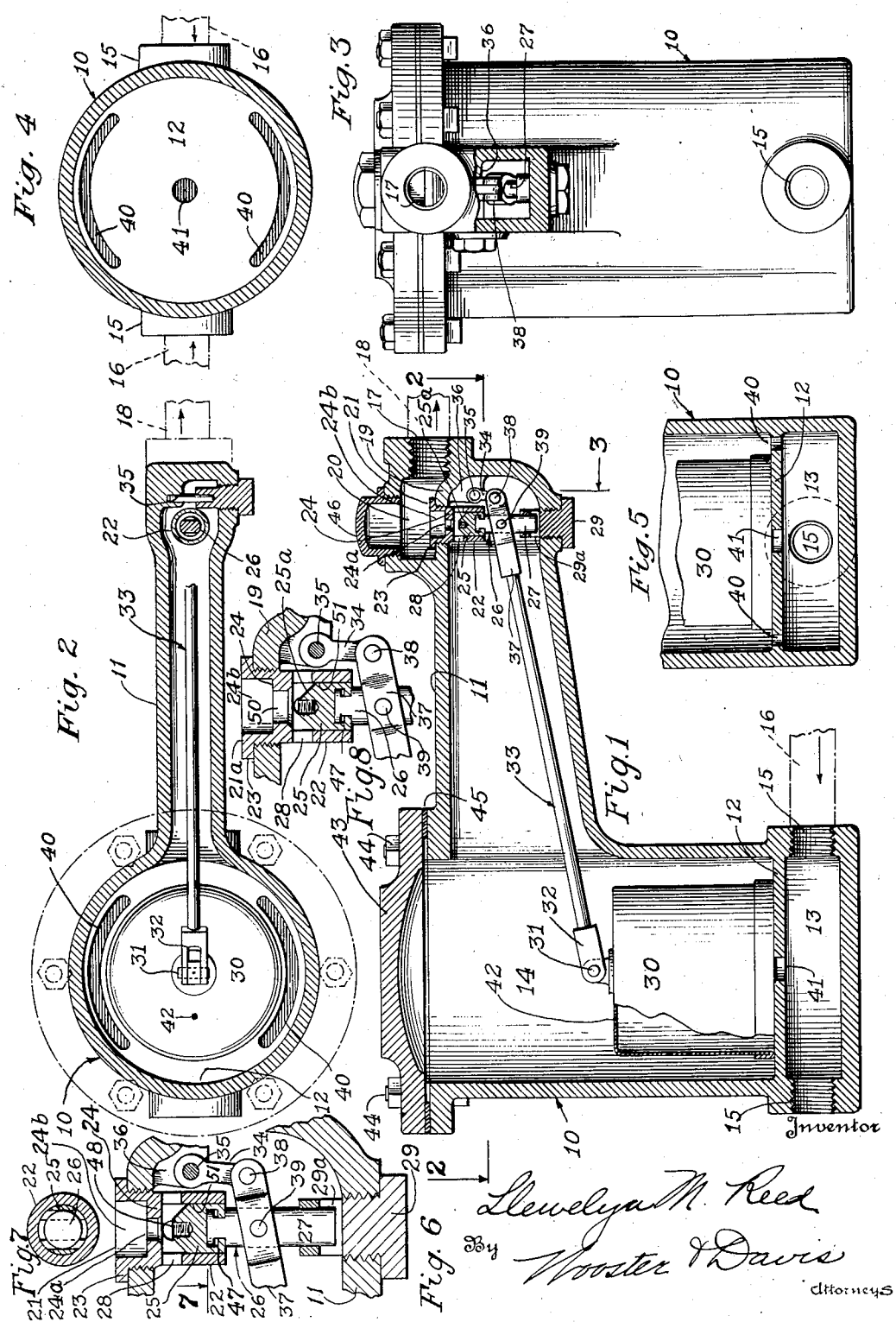
Inventor
Llewelyn M. Reed
By Wooster & Davis
Attorneys Patented Dec. 18, 1934

1,985,059

UNITED STATES PATENT OFFICE 1,985,059

STEAM TRAP

Llewelyn M. Reed, Devon, Conn., assignor of three-fourths to Bundy Steam Trap Company, Nashua, N. H., a corporation of New Hampshire Application November 20, 1931, Serial No. 576,258

8 Claims. (Cl. 137—103)

This invention relates to new and useful improvements in steam traps such as are used in connection with steam radiators or heating coils, driers, steam jacketed kettles or the like for the purpose of allowing the discharge of water and air and to prevent the escape of steam.

An object of the invention is to provide a steam trap including a casing adapted to be arranged in a pipe line and having an inlet and an outlet and a valve controlling the outlet, the parts being so constructed and arranged that the valve and its operating means may be removed from and replaced in the casing without disconnecting the casing from the pipe line.

A particular object is to provide a steam trap construction in which the control valve will remain fully open during the purging operation and will not be continuously opened and closed by operation of the float as is the operation in the ordinary trap, whereby the purging capacity is greatly increased over that of the ordinary trap and in which there is less wear and tear on the valve mechanism so that it is less liable to get out of order and will last longer and be more reliable.

Another object is to provide a steam trap casing having an inlet and an outlet, the casing being divided by a partitioning means into an upper or float chamber communicating with the outlet and a lower or a separating chamber communicating with the inlet, a float preferably in the form of an inverted bucket in the float chamber and serving to operate a valve controlling the outlet, the partitioning means having an opening beyond the sides of the bucket and providing for the passage of air and water from the separating chamber to the float chamber at the outer sides of the bucket whereby the bucket will not be operated by the force of the water flow, and said partitioning means having an opening beneath the bucket and spaced from the inlet and providing for the passage of steam from the inlet chamber into the bucket in a manner to cause the bucket to become buoyant and operate the valve.

A further object is to provide a steam trap including a novel valve operating arrangement comprising a simple lever mechanism for moving the valve to open and closed positions, and in which the parts are so arranged as to secure a large leverage for operating the valve by the float without objectionably increasing the size of the trap body and therefore without greatly increasing its cost. This permits the use of a larger valve and discharge passage with a given float and therefore provides greater purging capacity.

Another object is to provide a trap in which as soon as the discharge valve starts to move from its seat the flow of the water will tend to force it to open position thus assisting in the opening of the valve and insuring that the valve is fully opened to give maximum purging and prevent wire drawing of the valve and seat.

Still another object is to provide a construction in which without changing the valve or its operating means a member having the valve seat and discharge outlet therein may be removed and changed to thus change the purging capacity of the trap according to the pressure with which the trap is to be used and thus permit use of the trap for various pressures and secure the maximum purging capacity for each pressure.

Other objects and advantages will become apparent from a consideration of the following detailed description taken in connection with the accompanying drawing wherein a satisfactory embodiment of the invention is shown. It is to be understood that the invention is not limited to the details shown and described and that the drawing and description are to be considered in the nature of a disclosure of one specific embodiment of the invention illustrating the principles involved, and that the invention includes all such variations and modifications as fall within the spirit of the invention and the scope of the appended claims to which reference should be had for a definition of the invention.

In the drawing:

Fig. 1 is a vertical sectional view through the casing of the improved steam trap and showing the control valve in normal or open position;

Fig. 2 is a sectional view taken substantially along the line 2—2 of Fig. 1;

Fig. 3 is an end elevational view taken looking from the right in Fig. 1, a part being broken away to show details of construction as suggested by the line 3 in Fig. 1;

Fig. 4 is a horizontal sectional view through the casing and showing the openings or passages from the separating chamber of the casing to the float chamber thereof;

Fig. 5 is a vertical sectional view through the lower portion of the casing, the view being taken at right angles to Fig. 1;

Fig. 6 is a detailed sectional view of the valve;

Fig. 7 is a cross section through the valve head substantially on line 7, Fig. 6; and Fig. 8 is a section of the valve and its seat showing how the purging capacity of the trap may be varied and also how it may be changed by a simple operation to adapt it for use at different pressures.

Referring in detail to the drawing the improved steam trap includes a casing or hollow body 10 having a hollow lateral extension or arm 11 communicating with its upper portion. This permits a greatly increased leverage for operating the valve without increasing the size of the float chamber or the main portion of the body, thus insuring more positive and reliable operation without greatly increasing the cost. A partitioning means 12 which may be integral with the body or casing as shown, or a separate element as desired, divides the body or casing into a lower or separating chamber 13 and an upper or float chamber 14. The chamber 13 might also be termed the inlet or entrance chamber, and through any one or more side walls it has one or more threaded inlet openings 15 either or both of which may have a section of pipe 16 connected therewith, the said pipe being part of a line from a heating radiator, drier or like. When but one of the inlets 15 is connected with a pipe line the other inlet or inlets may be closed as by means of a plug.

The outlet from the trap is shown at 17 and is in the free end of the hollow extension 11, and this outlet is shown as threaded for connection with an outlet or drain pipe 18. It will therefore be seen that the inlet 15 and the outlet 17 provide means for mounting the trap or casing in a pipe line. A wall 19 in the outer end portion of the extension 11 serves to separate the inner and major portion of the extension from the outlet 17 and to provide a chamber 20 in communication with said outlet. Removably mounted in the wall 19 is a valve seat member 21 including a depending skirt portion 22 and a flange 23 resting in the wall. This member may be mounted in various ways but is preferably threaded into a tapped opening in the wall 19 and is provided with a non-circular socket 24b for insertion of a similarly shaped tool for turning the member to screw it into position or remove it therefrom.

A transverse wall 24 of the seat member 21 has a discharge passage 24a therein and provides a seat for the head 25 of a valve 26 to control this passage, the valve including a vertically disposed stem portion 27. Seat member 21 is hollow as shown and is provided with radially extending openings 28 in its skirt portion 22 immediately below the entrance to the passage 24a. Normally, the valve 26 occupies the open position in which it is shown in Fig. 1 when the float is in its lower position and the trap is discharging the air and water, and the chamber 14 of the casing is therefore in communication with the outlet 17 through the extension 11 and the chamber 20.

Valve 26 is mounted for vertical movement toward and from the valve seat in wall 24 in the seat member 21 and in such movement the valve is guided by the skirt portion 22 of the member 21 and the lower end of the stem 27 is guided by a bracket or plug member 29 mounted in a tapped opening in the lower wall of the lateral extension 11 and through which the valve stem operates. This plug has a transverse opening or passage 29a so that flow of water will prevent sediment collecting under the end of the stem. Of course, the function of the valve is to permit the passage of water through the trap to the outlet 17 and to prevent the passage of steam, and the valve therefore controls the outlet 17. The top wall 25a of the valve is tapered or inclined as shown, preferably at an angle of about 45 degrees so as to tightly close the passage, to facilitate opening of the valve and to permit use of passages 24a of different sizes as will later be described.

Means are provided for automatically operating this valve whereby the valve and in fact the trap will perform its required function. This means includes a float of any suitable type, that shown being an inverted bucket-type float 30 arranged for vertical movement in the chamber 14 and pivotally secured at its upper end, as by means of a pin 31, to the inner end 32 of a relatively long lever 33 extending into the hollow lateral extension 11 of the casing or body 10. This lateral extension permits the use of a long lever to secure great leverage for operating the valve without increasing the size of the body or float chamber, and therefore a larger valve and outlet passage with consequently greatly increased purging capacity can be used for any given pressures. It is obvious that the maximum size of the discharge passage which can be used is determined by the amount of pressure its lever is capable of overcoming. In the present construction the valve itself is constructed so that the flow of the water will assist the float in opening the valve. This will be described later. A substantially vertically disposed link 34 has its upper end pivotally mounted as by means of a pin 35 mounted in lugs 36 formed with the outer wall of the extension 11.

To the lower end of the link 34 is pivotally secured the inner end 37 of the relatively long lever 33 by a pin 38 and a second pin 39 arranged inwardly of the pin 38 serves to connect the end portion 37 of the long lever to the valve 26. Preferably, the free portion of the end 37 of the lever is bifurcated whereby to straddle the stem of the valve and to engage opposite faces of the lower end portion of the link 34.

From the foregoing description it will be obvious that should the float 30 be raised vertically in the chamber 14 the valve 26 will also be moved vertically and the head 25 of the valve will engage the valve seat in wall 24 and close off communication between the interior of the casing or body and the outlet 17. As before suggested this action takes place automatically on steam entering the trap, whereby to prevent the escape and waste of steam through the outlet or discharge pipe 18 of a line.

When the trap is connected in a line, water of condensation is carried to the trap through the side or pipe 16 of the line and discharged into the separating or inlet chamber 13. This chamber 13 communicates with the float chamber 14 through slots or passageways 40 formed in the partition 12 outside the float 30 adjacent the inner wall of the casing. Attention is particularly directed to the fact that the diameter of the float 30 is such and the location of the slots 40 is such that water and air moving through these passageways or slots from the inlet chamber 13 to the float chamber 14 enters the latter chamber at the outer sides of the float. That is, this water and air moving through the passageways 40 is not discharged at the underside of the float but is discharged beyond the sides of the float, or that is, outside the float.

This water and air will then simply pass up through the chamber 14, through the hollow extension 11 and into the relatively small chamber 20 and out through the outlet 17. The force of flow of the water will not be exerted against the float and will not therefore serve to elevate or operate the float. An additional opening or passageway 41 is provided in the partitioning means or wall 12, and the location of opening 41 is such that anything passing through this opening is discharged into the inverted bucket or float 30. It is noted that the passageways or slots 40 as well as the opening or passageway 41 are arranged in spaced relation to the inlet 15.

The operation of the improved trap as determined by actual experiments will now be described. It has been found that the greater portion of water and air from the pipe 16 being discharged into the chamber 13 will pass upwardly through the passageways or slots 40 into the chamber 14 as these slots are much larger than opening 41 and therefore offer less resistance to the flow of the water, and will not therefore serve to operate the float 30, as the force of flow of the water will not be exerted against the float since the water enters the float chamber at the outside of the float. However, when steam passes into the chamber 13 through the inlet 15 for some reason it tends to keep to the center and pass into the chamber 14 from the chamber 13 through the central opening 41 beneath or in line with the hollow float 30. This steam rising upwardly enters the float rendering the same buoyant by displacing the water, and the float will therefore rise causing the valve 26 to engage its seat and prevent the escape of steam through the outlet 17.

Any air passing upwardly through the passageways 40 will, of course, also be discharged through the outlet 17 and should any air pass upwardly through the opening 41 it will enter the float but will escape from the float through the vent 42 and the float will not therefore become air bound and remain in elevated or valve closing position. If steam does not continue to enter the trap that in the float will be condensed by contact with the float and water in the chamber 14 and the float will descend and open the valve to permit water coming in to escape. As soon as the valve 25 breaks from its seat water rushes through the openings 28 and as these openings extend laterally through the walls 22 it impinges on the inclined walls 25a of the valve and therefore the force of flow of the water helps to force the valve to the open position assisting the float. The valve therefore opens quickly and positively to its full open position. Furthermore, when the valve is open the flow of water assists in retaining it in this position. This operation greatly assists in securing increased purging capacity.

It will be apparent that the arrangement and operation as described will be advantageous since the float and parts moved thereby will not be constantly moving up and down due to the force of the water acting on the float and elevating it. Therefore, these parts will have less wear and longer life and the valve will remain fully open until steam enters the trap and the trap will therefore have greater purging capacity.

The slots 40 being considerably larger than the central opening 41 the greater portion of the water flow through these slots, but just why the steam tends to collect at the center and pass through the central opening 41 is not apparent, however, as stated above the mode of operation has been determined by experimentation to be that described. Since this is the case it will be obvious that the trap will remain open for the passage of air and water and will not be closed until steam begins to enter the trap at which time the float will act promptly to close the valve since substantially all of the steam entering the trap will be discharged into the float.

It will be noted that the inlet or inlets are at a closed or solid end of the casing or body 10 and preferably through the side walls thereof and that the outlet 17 is also through a side of the casing or body. This permits use of means whereby the interior of the trap may be inspected and whereby all of the operating parts within the trap may be removed and replaced without disconnecting the trap from the pipe line. To this end the casing or body 10 is open at its other end and this end is closed as by a removable head 43 secured in place as by bolts and nuts 44. Preferably a compressible packing 45 is arranged between the removable head 43 and the end of the body or casing 10.

The upper wall of the chamber 20 is provided with an opening in line with the valve seat member 21 and this opening is closed as by means of a removable plug or cap 46 threaded into the opening. It will be obvious that should the head 43 be removed, an operator may reach into the chamber 14 and remove the pivot pin 31 connecting the float and lever and thereafter remove the float from the chamber as for repair and replace it with a new float. This operation may take place without removing the trap from the pipe line of which pipes 16 and 18 are sections.

On removing the plug or cap 46 the operator may remove the valve seat member 21 by inserting the proper tool in the socket 24b and unscrewing the member, and thereafter may also remove the valve if desired. The valve 25 is preferably made as a separate element from the stem 27 and detachably secured thereto. As shown the stem is provided with a pair of transverse slots 47 below the end forming a T-shaped end, and the valve 25 has a transverse T-shaped slot to receive it. In the upper end is a tapped opening 48. After the member 21 is removed the threaded end of a bar may be screwed into the opening 48 and then the valve slid sideways off the stem and removed. Of course, it can be mounted by a reverse operation.

This construction permits adapting the trap for maximum purging capacity for any given pressure without changing the other parts. The size of the discharge opening 24a is limited by the pressure with which the trap is to be used, it being evident that with a lower pressure a given float will open a larger valve than it can when the pressure is higher. Thus if the valve shown in Figs. 1 and 6 is designated for a given pressure, it will be evident that if it is to be used with a lower pressure a larger outlet passage 24a may be used and therefore a greater purging capacity secured. To secure this advantage all that is necessary is to remove the valve seat member 21 and insert in its place another member 21a having a larger outlet passage indicated 50 in Fig. 8. In this case the bore 51 in the lower portion of the member 21a is not bored so deeply for the valve 25 as it is in Fig. 6, thus bringing the valve seat down lower, which with the tapered end 25a of the valve automatically adjusts for the increased size of the valve seat and does not permit the valve and the float 30 to rise any higher to close the outlet passage 50 than it does with the seat member 21 in Figs. 1 and 6. Thus for this change no adjustment of the other parts is necessary. It will be evident that if the trap is to be changed for a higher pressure the passage will be smaller and the bore 51 extended deeper or higher.

If desired the pivot pin 38 may be removed and provided the head 43 is removed the entire operating assembly may be taken out of the trap. That is, the float, lever 33, valve 26, and valve seat member 21 may all be removed from the trap without disconnecting the trap from the pipe line. Moreover, these parts may be inspected in place and without removing them from the trap and without removing the trap from the pipe line. Therefore, a trap of the construction shown will be more likely to receive the proper inspection than would a trap which must be removed from the pipe line before inspection can be made. Additionally, not only can the proper inspection be made without removing the trap from the pipe line, but defective parts may be removed and new parts substituted with very little delay and without disconnecting the trap.

Having thus set forth the nature of my invention, what I claim is:

1. In a steam trap, a casing having an inlet at its lower end, said casing having a horizontally extending hollow arm forming a lateral extension adjacent its upper end of less height than the casing and communicating with the interior thereof, an outlet at the free end of said extension, said inlet and outlet providing means for connecting the casing in a pipe line, a float in the casing, said float adapted for vertical movement, a valve in the extension adjacent the free end thereof, a short vertically disposed link pivotally mounted at one end in the extension beyond the valve, a relatively long lever pivotally connected at its inner end with the float, said lever at its outer end pivotally connected with the other end of the short link, and said valve carried by the long lever inwardly of but adjacent the link and adapted to be operated by the float through the lever to control the outlet.

2. In a steam trap, a casing having an inlet at its lower end, said casing having a horizontally extending hollow arm forming a lateral extension communicating with the interior and spaced above the lower end thereof, an outlet in said extension arranged adjacent the free end thereof, said inlet and outlet providing means for connecting the casing in a pipe line, an inverted bucket type float in the casing, a valve controlling the outlet, a relatively long lever pivotally connected at its inner end with the top of the float and at its outer end pivotally mounted adjacent the free end of the extension, said valve carried by the lever adjacent the outer end thereof and movable upwardly to closed position, said float adapted to operate the lever to open and close the valve, and a removable plug in the extension and adjacent the valve and adapted to be removed to permit removal and replacement of the valve without disconnecting the casing from the pipe line.

3. In a steam trap, a casing having an inlet at its lower end, said casing having a horizontally extending hollow arm forming a lateral extension communicating with the interior and spaced above the lower end thereof, an outlet in said extension, said outlet arranged at the free end of the extension, said inlet and outlet providing means for connecting the casing in a pipe line, a float in the casing, a valve in the extension and controlling the outlet, a relatively long lever pivotally connected at its inner end with the float and at its outer end pivotally mounted adjacent the free end of the extension, said valve carried by the lever adjacent the outer end thereof and movable upwardly to closed position, said float adapted to operate the lever to open and close the valve, and a removable head closing the upper end of said casing, and said head adapted to be removed to permit of inspection and repair of the float without disconnecting the casing from the pipe line.

4. In a steam trap, a casing, a substantially horizontal partitioning means dividing the casing into an upper float chamber and a lower separating chamber, an inverted bucket type float in the upper chamber, an inlet to the separating chamber and an outlet from the upper portion of the float chamber whereby the casing may be connected in a pipe line, a valve operated by the float and controlling the outlet, a pair of upright passages from the separating chamber to the float chamber through the partitioning means one of them arranged to discharge steam into the float, and the other of said passages being for water and larger than the first passage and arranged beyond the side walls of the float whereby the float will not be operated by the force of the water passing from the separating chamber to the float chamber.

5. In a steam trap, a casing, a substantially horizontal partitioning means dividing the casing into an upper float chamber and a lower separating chamber, an inverted bucket type float in the upper chamber, an inlet through a vertical side wall of the casing to the separating chamber, an outlet from the float chamber, said inlet and outlet providing for the connecting of the casing in a pipe line, a valve operated by the float and controlling the outlet, an upright passage through the partitioning means and spaced from the inlet and adapted to discharge steam into the float to operate the float to move the valve into a position closing the outlet, and another and larger upright passage through the partitioning means from the separating to the float chamber and beyond the side walls of the float and arranged to discharge water upwardly from the separating to the float chamber in spaced relation to the float whereby the force of the flow of the water will not operate the float.

6. In a steam trap, a casing, a substantially horizontal partitioning means dividing the casing into an upper float chamber and a lower separating chamber, an inverted bucket type float in the upper chamber, an inlet to the separating chamber, an outlet from the float chamber, said inlet and outlet providing for the connecting of the casing in a pipe line, a valve operated by movement of the float and controlling the outlet, an upright passage through the partitioning means and spaced from the inlet and adapted to discharge steam into the float to operate the same into valve closing position, and another and larger upright passage through the partitioning means and at the outer side of the side walls of the float and arranged to discharge water upwardly from the separating to the float chamber outside the float whereby the force of the flow of the water will not operate the float.

7. In a steam trap, a casing, a partitioning means dividing the casing into an upper float chamber and a lower separating chamber, an inverted bucket type float in the upper chamber, an inlet to the separating chamber, an outlet from the float chamber, a valve controlling said outlet operated by said float, said partitioning means being provided with an upright passage leading from the separating chamber into the bucket and a larger upright passage leading from said chamber and discharging upwardly into the float chamber outside the bucket.

8. In a steam trap, a casing, a partitioning means dividing the casing into an upper float chamber and a lower separating chamber, an inverted bucket type float in the upper chamber, an inlet to the separating chamber, an outlet from the float chamber, a valve controlling said outlet operated by said float, said partitioning means being provided with an upright passage leading from the central portion of the separating chamber and discharging into the lower open end of the bucket and a larger upright passage spaced laterally from the first passage and discharging upwardly into the float chamber outside the bucket.

LLEWELYN M. REED.